US012692924B2

(12) United States Patent
Iriondo et al.

(10) Patent No.: US 12,692,924 B2
(45) Date of Patent: Jul. 28, 2026

(54) DAMPER WITH ATTACHED VALVE

(71) Applicant: Advanced Suspension Technology LLC, Northville, MI (US)

(72) Inventors: Jon Iriondo, Zaldibar (ES); Stefan Deferme, Heusden-Zolder (BE); Veronica Diez, Bilbao (ES)

(73) Assignee: Advanced Suspension Technology LLC, Northville, MI (US)

( * ) Notice: Subject to any disclaimer, the term of this patent is extended or adjusted under 35 U.S.C. 154(b) by 957 days.

(21) Appl. No.: 17/823,673

(22) Filed: Aug. 31, 2022

(65) Prior Publication Data

US 2024/0068539 A1     Feb. 29, 2024

(51) Int. Cl.
F16F 9/18 (2006.01)
B60G 13/08 (2006.01)
(Continued)

(52) U.S. Cl.
CPC ............... F16F 9/18 (2013.01); F16F 9/369 (2013.01); F16F 9/50 (2013.01); B60G 13/08 (2013.01); B60G 17/08 (2013.01); B60G 2202/24 (2013.01); B60G 2204/62 (2013.01); B60G 2206/41 (2013.01); B60G 2500/11 (2013.01);
(Continued)

(58) Field of Classification Search
CPC ........ F16F 9/369; F16F 9/18; F16F 2222/128; F16F 2222/12; F16F 2224/0208; F16F 1114/025; F16F 2230/0005; F16F 2230/30; F16F 2232/08; F16F 2234/02;
(Continued)

(56) References Cited

U.S. PATENT DOCUMENTS

| 5,163,538 A | * | 11/1992 | Derr | F16F 9/46 |
| | | | | 188/282.4 |
| 5,603,392 A | * | 2/1997 | Beck | F16F 9/325 |
| | | | | 188/266.6 |

(Continued)

FOREIGN PATENT DOCUMENTS

| CN | 215634633 U | 1/2022 |
| CN | 216111899 U | 3/2022 |

(Continued)

*Primary Examiner* — Robert A. Siconolfi
*Assistant Examiner* — James K Hsiao
(74) *Attorney, Agent, or Firm* — Harness, Dickey & Pierce, P.L.C.

(57) ABSTRACT

A damper includes an outer tube elongated along an axis, a cylinder elongated along the axis within the outer tube, a piston disposed in the cylinder and movable along the axis, an intermediate tube attached concentrically around the cylinder, a ring press-fitted around an outer diameter of the intermediate tube, and a valve attached to the outer tube. The intermediate tube and the cylinder define an intermediate chamber radially between the cylinder and the intermediate tube. The valve is in fluid communication with the intermediate chamber. The intermediate tube includes an intermediate-tube opening extending radially through the intermediate tube. The ring includes a ring opening extending radially through the ring. The ring opening is aligned with the intermediate-tube opening. The valve is in fluid communication with the intermediate chamber through the ring opening and the intermediate-tube opening.

20 Claims, 6 Drawing Sheets

(51) Int. Cl.

| | | |
|---|---|---|
| *B60G 17/08* | (2006.01) | |
| *F16F 9/36* | (2006.01) | |
| *F16F 9/50* | (2006.01) | |

(52) U.S. Cl.
CPC .... *B60G 2800/162* (2013.01); *F16F 2222/12* (2013.01); *F16F 2228/066* (2013.01); *F16F 2230/30* (2013.01)

(58) Field of Classification Search
CPC .... B60G 13/08; B60G 17/08; B60G 2202/24; B60G 2206/41; B60G 2800/162
See application file for complete search history.

(56) References Cited

U.S. PATENT DOCUMENTS

| | | | | |
|---|---|---|---|---|
| 5,651,433 | A * | 7/1997 | Wirth | F16F 9/325 188/266.6 |
| 5,988,331 | A | 11/1999 | Schiffler | |
| 6,145,894 | A * | 11/2000 | Myers | F16F 9/0454 285/322 |
| 6,283,259 | B1 * | 9/2001 | Nakadate | F16F 9/369 188/299.1 |
| 6,527,093 | B2 * | 3/2003 | Oliver | F16F 9/464 188/315 |
| 8,469,162 | B2 * | 6/2013 | Nishimura | F16F 9/325 188/266.2 |
| 8,584,818 | B2 * | 11/2013 | Murakami | F16F 9/348 188/322.15 |
| 8,899,391 | B2 * | 12/2014 | Yamasaki | F16F 9/50 188/315 |
| 9,169,888 | B2 * | 10/2015 | Nishimura | F16F 9/3235 |
| 9,353,822 | B2 * | 5/2016 | Yamasaki | B23P 19/04 |
| 9,388,877 | B2 * | 7/2016 | Konakai | F16F 9/325 |
| 9,441,698 | B2 * | 9/2016 | Suzuki | F16F 9/062 |
| 9,856,939 | B2 * | 1/2018 | Matsumoto | F16F 9/3257 |
| 10,107,349 | B2 * | 10/2018 | Murakami | F16F 9/34 |
| 10,344,819 | B2 * | 7/2019 | Schmidt | F16F 9/3207 |
| 10,458,509 | B2 * | 10/2019 | Kobayashi | F16F 9/464 |
| 11,441,633 | B2 * | 9/2022 | Deferme | F16F 9/369 |
| 11,555,525 | B2 * | 1/2023 | Schmidt | F16F 9/369 |
| 11,906,015 | B2 * | 2/2024 | Deferme | F16F 9/185 |
| 12,146,548 | B2 * | 11/2024 | Deferme | F16F 9/185 |
| 2006/0283677 | A1 * | 12/2006 | Schmidt | F16F 9/325 188/322.19 |
| 2012/0073920 | A1 * | 3/2012 | Yamasaki | F16F 9/48 188/315 |
| 2014/0339032 | A1 * | 11/2014 | Yamasaki | F16F 9/325 188/297 |
| 2017/0299009 | A1 * | 10/2017 | Murakami | F16F 9/435 |
| 2019/0001783 | A1 * | 1/2019 | Garcia | F16F 9/18 |
| 2021/0062887 | A1 * | 3/2021 | Schmidt | F16F 9/3257 |
| 2022/0049755 | A1 * | 2/2022 | Deferme | F16F 9/3488 |
| 2024/0084868 | A1 * | 3/2024 | Sanchez | F16F 9/369 |

FOREIGN PATENT DOCUMENTS

| | | | |
|---|---|---|---|
| DE | 102015209177 | A1 | 11/2016 |
| KR | 100660730 | B1 | 12/2006 |
| KR | 100748847 | B1 | 8/2007 |

* cited by examiner

DAMPER WITH ATTACHED VALVE

BACKGROUND

Dampers are typically used in conjunction with automotive suspension systems or other suspension systems to control movement of wheels of a vehicle relative to a body of the vehicle. In order to control movement, dampers are generally connected between the sprung (body) and the unsprung (suspension/drivetrain) masses of the vehicle.

SUMMARY

A damper includes an outer tube elongated along an axis, a cylinder elongated along the axis within the outer tube, a piston disposed in the cylinder and movable along the axis, an intermediate tube attached concentrically around the cylinder, a ring press-fitted around an outer diameter of the intermediate tube, and a valve attached to the outer tube. The intermediate tube and the cylinder define an intermediate chamber radially between the cylinder and the intermediate tube. The valve is in fluid communication with the intermediate chamber. The intermediate tube includes an intermediate-tube opening extending radially through the intermediate tube. The ring includes a ring opening extending radially through the ring. The ring opening is aligned with the intermediate-tube opening. The valve is in fluid communication with the intermediate chamber through the ring opening and the intermediate-tube opening.

In an example, the valve may include a valve tube extending radially relative to the axis and abutting the ring, and the valve is in fluid communication with the intermediate chamber via the valve tube. In a further example, the valve tube may extend radially through the outer tube.

In an example, a diameter of the intermediate-tube opening may be at least as great as a diameter of the ring opening. In a further example, the diameter of the ring opening may be equal to the diameter of the intermediate-tube opening.

In an example, the ring may include a radially outer surface, the radially outer surface may include a flat portion, and the ring opening may extend through the ring at the flat portion. In a further example, the valve may include a valve tube extending radially relative to the axis and abutting the flat portion of the radially outer surface of the ring, and the valve may be in fluid communication with the intermediate chamber via the valve tube.

In an example, the ring opening may extend from a radially inner end to a radially outer end, and the ring may include a ridge extending around the radially outer end of the ring opening. In a further example, the valve may include a valve tube extending radially relative to the axis and abutting the ring within the ridge, and the valve may be in fluid communication with the intermediate chamber via the valve tube.

In an example, the damper may further include a sleeve lining the ring opening. In a further example, the sleeve extends from a radially inner end at a radially inner surface of the ring to a radially outer end at a radially outer surface of the ring, and the sleeve includes a ridge extending around the radially outer end of the sleeve. In a yet further example, the valve may include a valve tube extending radially relative to the axis and abutting the sleeve within the ridge, and the valve may be in fluid communication with the intermediate chamber via the valve tube.

In an example, the ring may extend more than 180° and less than 360° around the axis.

In an example, a radial thickness of the ring may be greater at the ring opening than at a point on the ring 180° around the axis from the ring opening.

In an example, the outer tube may define an outer chamber, and the outer chamber is in fluid communication with the intermediate chamber via the valve. In a further example, the valve may be actuatable to adjust a flow rate between the outer chamber and the intermediate chamber.

In an example, the cylinder may define a cylinder chamber, and the cylinder may include a cylinder opening permitting flow between the cylinder chamber and the intermediate chamber. In a further example, the cylinder opening may be offset along the axis from the ring.

In an example, the intermediate tube may extend axially from a first end to a second end, the first end of the intermediate tube may be sealed to the cylinder around the outer diameter of the cylinder, and the second end of the intermediate tube may be sealed to the cylinder around the outer diameter of the cylinder.

In an example, the piston may divide the cylinder into a first cylinder chamber and a second cylinder chamber, and movement of the piston may change volumes of the first cylinder chamber and the second cylinder chamber.

DETAILED DESCRIPTION

Figure 1:
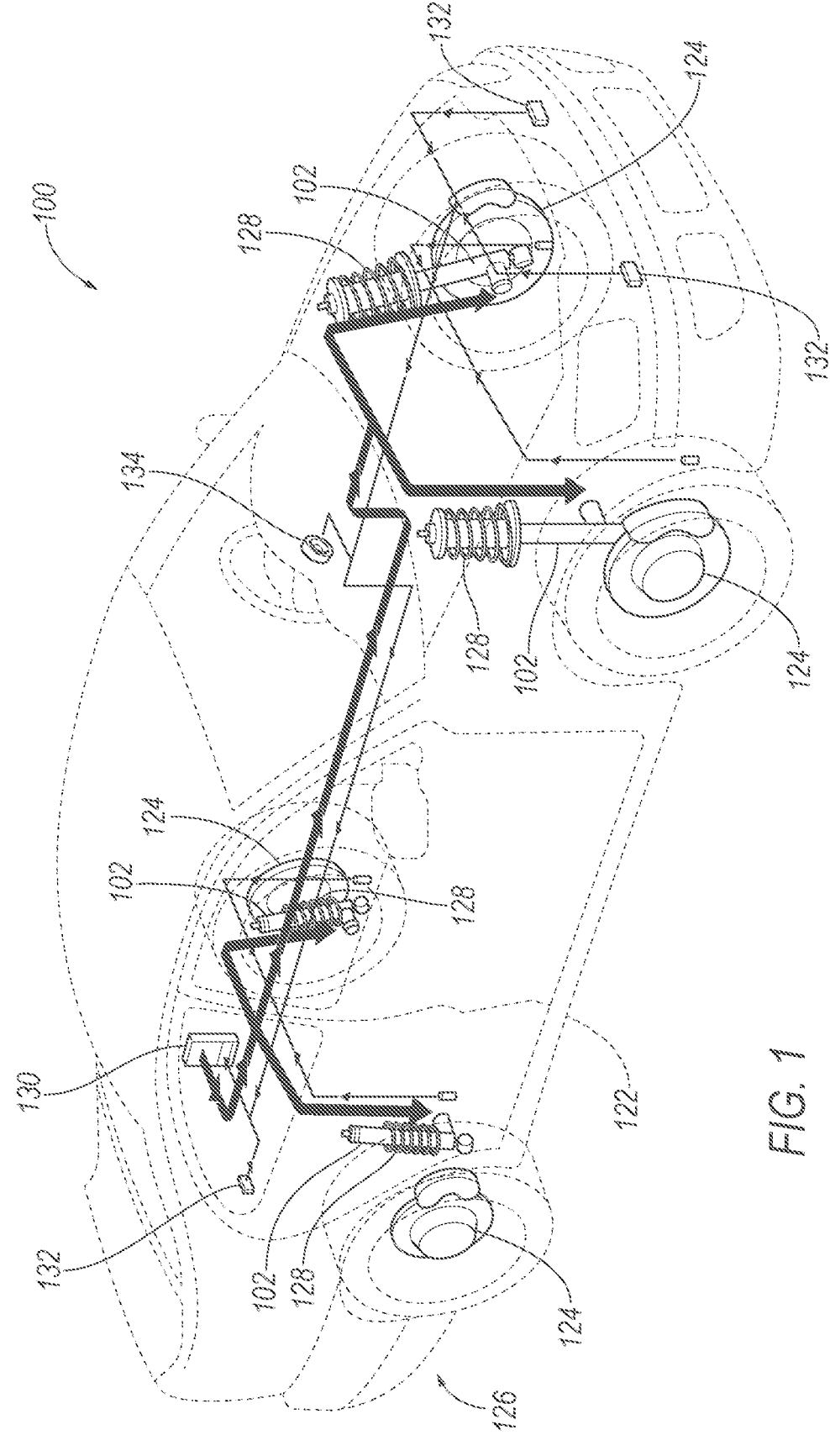
FIG. 1 is a perspective view of an example vehicle with a suspension system.

With reference to the Figures, wherein like numerals indicate like parts throughout the several views, a damper 102 for a vehicle 100 includes an outer tube 104 elongated along an axis A, a cylinder 106 elongated along the axis A within the outer tube 104, a piston 108 disposed in the cylinder 106 and movable along the axis A, an intermediate tube 110 attached concentrically around the cylinder 106, a ring 112 press-fitted around an outer diameter of the intermediate tube 110, and a valve 114 attached to the outer tube 104. The intermediate tube 110 and the cylinder 106 define an intermediate chamber 116 radially between the cylinder 106 and the intermediate tube 110. The valve 114 is in fluid communication with the intermediate chamber 116. The intermediate tube 110 includes an intermediate-tube opening 118 extending radially through the intermediate tube 110. The ring 112 includes a ring opening 120 extending radially through the ring 112. The ring opening 120 is aligned with the intermediate-tube opening 118. The valve 114 is in fluid communication with the intermediate chamber 116 through the ring opening 120 and the intermediate-tube opening 118.

The damper 102 can provide an active or semi-active suspension for the vehicle 100 by using the valve 114. The valve 114 can be adjusted in real time to change the damping force exerted by the damper 102 by changing the rate of flow through the valve 114 into and out of the intermediate chamber 116. The ring 112 provides the connection between the valve 114 and the intermediate chamber 116. The connection provided by the ring opening 120 is rigid because of the press fit of the ring 112 over the intermediate tube 110. The ring opening 120 provides a way to seal the connection between the valve 114 and the intermediate chamber 116. The connection is durable because the ring 112 and the ring opening 120 obviate the need for an o-ring or gasket that may be more subject to wear than the ring 112 is.

With reference to FIG. 1, the vehicle 100 may be any passenger or commercial automobile such as a car, a truck, a sport utility vehicle, a crossover, a van, a minivan, a taxi, a bus, etc.

The vehicle 100 includes a frame 122. The vehicle 100 may be of a unibody construction, in which the frame 122 and a body of the vehicle 100 are a single component. The vehicle 100 may, alternatively, be of a body-on-frame construction, in which the frame 122 supports a body that is a separate component from the frame 122. The frame 122 and body may be formed of any suitable material, for example, steel, aluminum, etc.

The vehicle 100 includes wheels 124 that control motion of the vehicle 100 relative to ground supporting the vehicle 100, e.g., acceleration, declaration, turning, etc. Vertical movement of the wheels 124 relative to the frame 122 affects an amount of traction between the wheels 124 and the ground and an amount of vertical acceleration experienced by occupants of the vehicle 100 when the vehicle 100 travels over bumps and the like, e.g., the ride feel experienced by the occupants.

The vehicle 100 includes a suspension system 126. The suspension system 126 is coupled to the frame 122 and to each wheel 124. The suspension system 126 absorbs and dampens shocks and vibrations from the wheels 124 to the frame 122. For each wheel 124, the suspension system 126 may include a coil spring 128 and the damper 102. The dampers 102 may extend through the respective coil springs 128. One end of the damper 102 and the coil spring 128 may be connected to and move with the wheel 124, and the other end of the damper 102 and the coil spring 128 may be connected to and move with the frame 122.

The suspension system 126 is arranged so that an upward motion of the wheel 124, such as when the tire hits a bump while the vehicle 100 is in motion, compresses the coil spring 128 and the damper 102. The coil spring 128 may exert a force that is a function, e.g., a linear relation, of a difference between the current length of the coil spring 128 and a relaxed length of the coil spring 128. The damper 102 may exert a force that is a function of a speed of compression or extension of the damper 102.

The suspension system 126 may include an electronic control unit (ECU) 130. The ECU 130 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The ECU 130 can thus include a processor, a memory, etc. The memory of the ECU 130 can include media for storing instructions executable by the processor as well as for electronically storing data and/or databases, and/or the ECU 130 can include structures such as the foregoing by which programming is provided. The ECU 130 can be multiple such computers coupled together.

The ECU 130 may be communicatively coupled to the dampers 102, e.g., to the valves 114. The ECU 130 may be programmed to independently actuate the valves 114, e.g., to change the flow rates through the valves 114. For example, the ECU 130 may be programmed to actuate the valve 114 for one of the dampers 102 based on data from sensors 132 of the vehicle 100, based on a command from an occupant of the vehicle 100 provided via an input 134, etc.

The damper 102 is movable from a compressed position to an extended position, and vice versa. A distance between mounting points of the damper 102 is smaller in the compressed position than in the extended position. The coil springs 128 or the like may urge the dampers 102 toward the extended position. Force applied to the wheels 124 of the vehicle 100, e.g., from bumps, potholes, etc., may urge to dampers 102 toward the compressed positions.

Figure 2A:
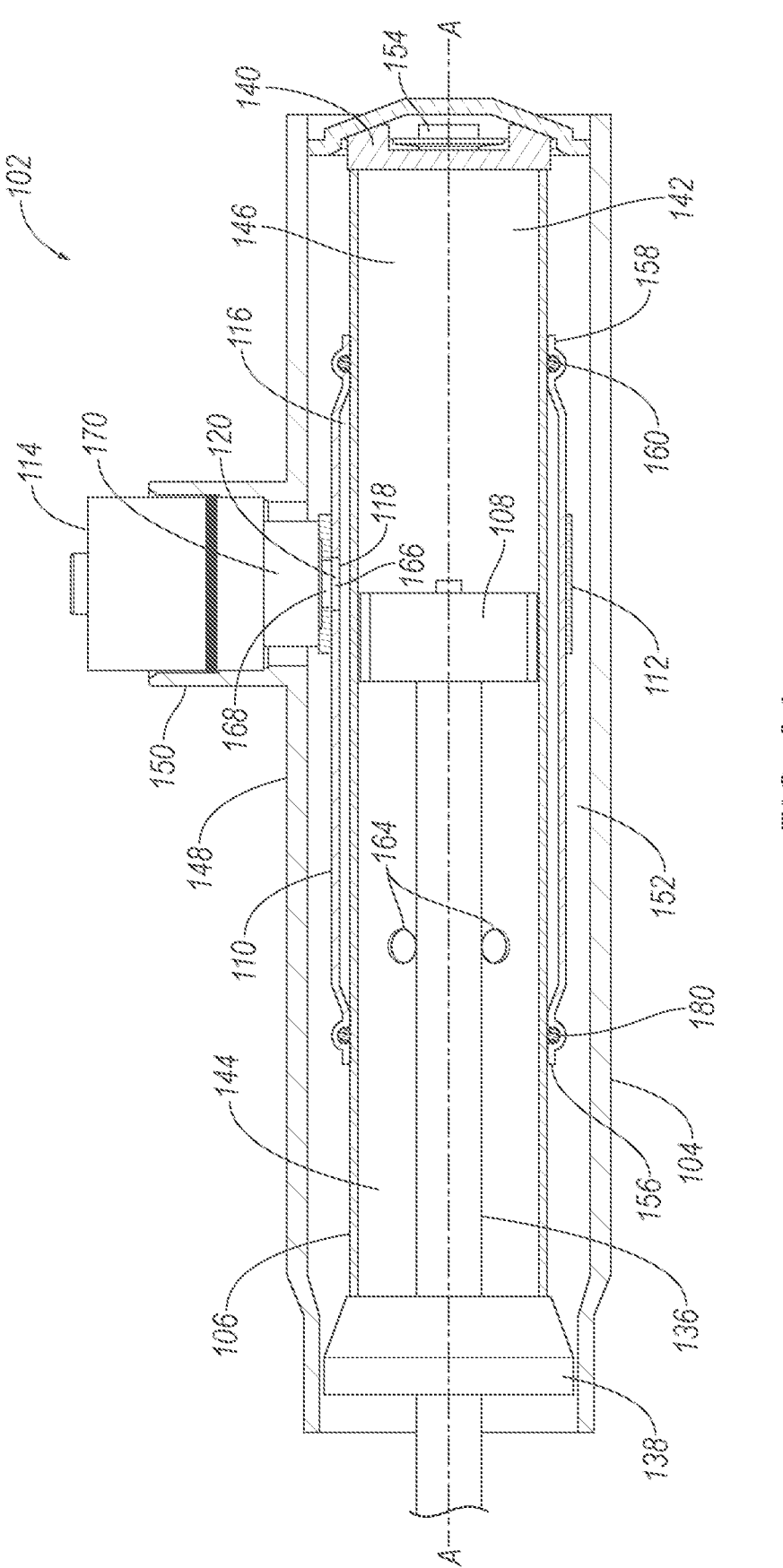
FIG. 2A is a side cross-sectional view of an example damper of the suspension system.
Figure 2B:
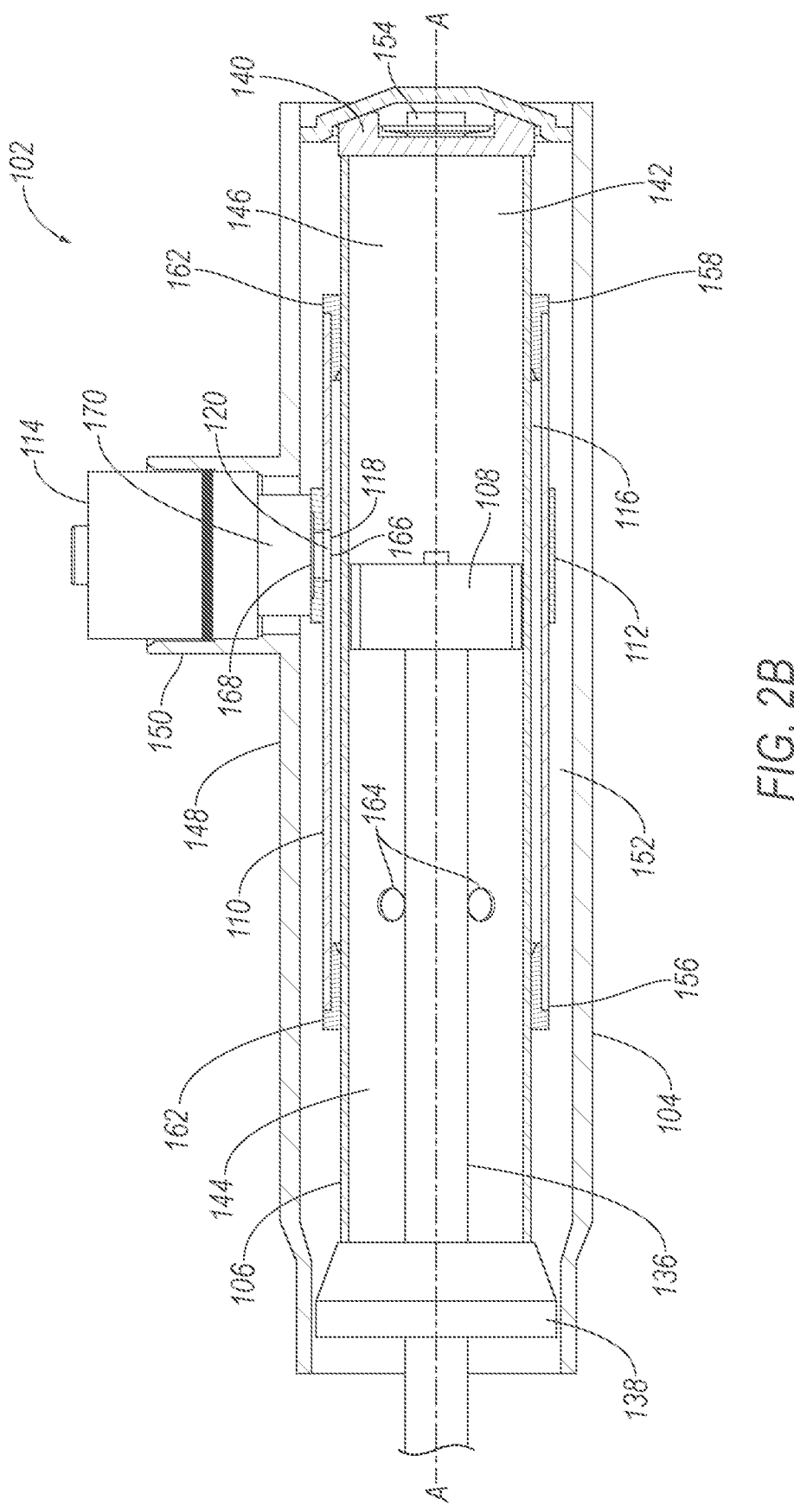
FIG. 2B is a side cross-sectional view of another example damper of the suspension system.

With reference to FIGS. 2A-B, each damper 102 controls movement of the respective wheel 124 by limiting fluid flow into, out of, and/or between a first cylinder chamber 144 and a second cylinder chamber 146. As will be described in more detail further below, fluid movement is caused by a movement of the piston 108 within the cylinder 106 of the damper 102, e.g., when the damper 102 is moved toward the compressed position or the extended position. Movement of the piston 108 changes volumes of the first cylinder chamber 144 and the second cylinder chamber 146.

The damper 102 defines the axis A. The axis A extends between the mounting points of the damper 102. The damper 102 may be elongated along the axis A. The terms "axially," "radially," and "circumferentially" used herein are relative to the axis A defined by the damper 102.

The damper 102 may include the outer tube 104, the cylinder 106 concentrically within the outer tube 104, endcaps 138, 140 at axial ends of the outer tube 104, the piston 108 in the cylinder 106, a piston rod 136 fixed to the piston 108, the intermediate tube 110 attached concentrically around the cylinder 106, and the ring 112 press-fitted around the intermediate tube 110.

The cylinder 106 has a cylindrical shape defining the axis A. The cylinder 106 is elongated along the axis A within the outer tube 104 from the first endcap 138 to the second endcap 140. The first endcap 138 and the second endcap 140 each have a circular shape centered on the axis A. The cylinder 106 has a circular cross-section orthogonal to the axis A, and the circular cross-section is projected from the first endcap 138 to the second endcap 140. The first endcap 138 and the second endcap 140 extend radially inward from the cylinder 106 toward the axis A. The endcaps 138, 140 may be positioned at axial ends of the outer tube 104. The first endcap 138, the second endcap 140, and the cylinder 106 are attached to and fixed relative to each other.

The cylinder 106 at least partially defines a cylinder chamber 142, e.g., the cylinder 106, the first endcap 138, and the second endcap 140 define the cylinder chamber 142. The cylinder chamber 142 is contained within the cylinder 106, the first endcap 138, and the second endcap 140. The cylinder chamber 142 is sealed such that fluid can only flow into or out of the cylinder chamber 142 through an end-cap valve 114 or cylinder openings 164, both described below.

The piston 108 is disposed in the cylinder chamber 142. The piston 108 has a circular cross-section centered on the axis A and forming a seal with the cylinder 106. The piston 108 contacts and forms a seal with the cylinder 106 circumferentially for 360° around the axis A. The piston 108 divides the cylinder chamber 142 into the first cylinder chamber 144 and the second cylinder chamber 146. The first cylinder chamber 144 is adjacent the first endcap 138 and is enclosed by the first endcap 138, the cylinder 106, and the piston 108. The second cylinder chamber 146 is adjacent the second endcap 140 and is enclosed by the second endcap 140, the cylinder 106, and the piston 108. The piston 108 is movable along the axis A and thereby changes the volumes of the first cylinder chamber 144 and the second cylinder chamber 146.

The piston rod 136 is fixed to the piston 108. The piston rod 136 is elongated along the axis A from the piston 108 to and through the first endcap 138. The piston rod 136 is disposed partially inside the first cylinder chamber 144 and partially outside the cylinder 106. The piston rod 136 has a constant cross-section that is projected from the piston 108 through the first endcap 138, permitting a seal to be maintained with the first endcap 138.

The outer tube 104 extends circumferentially around the cylinder 106 and is elongated along the axis A from the first endcap 138 to the second endcap 140. The outer tube 104 includes a cylindrical portion 148 and a valve receptacle 150. The cylindrical portion 148 can be centered on the axis A and extend from the first endcap 138 to the second endcap 140. The valve receptacle 150 may extend radially outward from the cylindrical portion 148. The valve receptacle 150 can be sized to receive the valve 114 and form a seal with the valve 114. The outer tube 104 may be an integral piece, i.e., made of a single, uniform piece of material with no seams, joints, fasteners, or adhesives holding it together.

The outer tube 104 defines an outer chamber 152. The outer chamber 152 is radially between the outer tube 104 and either the intermediate tube 110 or an exposed portion of the cylinder 106, i.e., radially inside the outer tube 104 and radially outside the cylinder 106 and the intermediate tube 110. The outer chamber 152 extends from the first endcap 138 to the second endcap 140. The first endcap 138 and the second endcap 140 each extend radially outward from the cylinder 106 to the outer tube 104. The outer chamber 152 is sealed except for the valve receptacle 150 and an endcap valve 154. The outer chamber 152 and the cylinder chamber 142 are together completely sealed from an environment outside the outer tube 104, i.e., there are no fluid paths between the cylinder chamber 142 or outer chamber 152 and the environment outside the outer tube 104, except possibly through the valve 114.

The endcap valve 154 fluidly connects and controls flow between the second cylinder chamber 146 and the outer chamber 152. The endcap valve 154 extends through the second endcap 140. As the piston 108 and piston rod 136 move axially toward the second endcap 140, the endcap valve 154 permits flow of fluid out of the second cylinder chamber 146 into the outer chamber 152 to compensate for the decreasing volume of the second cylinder chamber 146, and as the piston 108 and piston rod 136 move axially toward the first endcap 138, the endcap valve 154 permits flow of fluid into the second cylinder chamber 146 from the outer chamber 152 to compensate for the increasing volume of the second cylinder chamber 146. The endcap valve 154 can be sized to permit a defined rate of flow between the second cylinder chamber 146 and the outer chamber 152, thereby helping to control the damping force provided by the damper 102.

The intermediate tube 110 is attached concentrically around the cylinder 106. The intermediate tube 110 can be positioned radially between the cylinder 106 and the outer tube 104. The intermediate tube 110 can have a cylindrical shape centered on the axis A. The intermediate tube 110 can extend axially from a first end 156 to a second end 158. The first end 156 can be closer to the first endcap 138 than the second end 158 is, and the second end 158 can be closer to the second endcap 140 than the first end 156 is. The first end 156 can be spaced from the first endcap 138, and the second end 158 can be spaced from the second endcap 140. The intermediate tube 110 can leave the portions of the cylinder 106 extending from the first end 156 to the first endcap 138 and from the second end 158 to the second endcap 140 exposed to the outer chamber 152.

The first end 156 and the second end 158 of the intermediate tube 110 are each sealed to the cylinder 106 around the outer diameter of the cylinder 106. For example, as shown in FIG. 2A, the intermediate tube 110 can have a narrowed diameter at the first end 156 and at the second end 158 so that the intermediate tube 110 is contacting the cylinder 106 concentrically around the outer diameter of the cylinder 106. The damper 102 may include o-rings 160 forming seals between the cylinder 106 and the narrowed diameter portions of the intermediate tube 110 at the first end 156 and at the second end 158. For another example, as shown in FIG. 2B, the damper 102 may include intermediate-tube sleeves 162 at the first end 156 and at the second end 158. An inner diameter of the intermediate-tube sleeves 162 may concentrically contact and form a seal with the cylinder 106, and an outer diameter of the intermediate-tube sleeves 162 may concentrically contact and form a seal with the intermediate tube 110. With the intermediate-tube sleeves 162, the intermediate tube 110 may have a constant diameter from the first end 156 to the second end 158, making manufacture of the intermediate tube 110 easier.

The intermediate tube 110 and the cylinder 106 define the intermediate chamber 116 radially between the cylinder 106 and the intermediate tube 110. The intermediate-tube chamber may be sealed except for the intermediate-tube opening 118 and cylinder openings 164, as will both be described below.

The cylinder 106 may include at least one cylinder opening 164, e.g., a plurality of cylinder openings 164. The cylinder openings 164 permit flow between the cylinder chamber 142, e.g., the first cylinder chamber 144, and the intermediate chamber 116. The cylinder openings 164 can extend radially through the cylinder 106. The cylinder openings 164 can be offset along the axis A from the ring 112. The cylinder openings 164 can be circumferentially spaced from each other around the axis A for more evenly distributed flow into and out of the intermediate chamber 116.

The intermediate tube 110 includes the intermediate-tube opening 118 extending radially through the intermediate tube 110. The intermediate-tube opening 118 permits flow between the intermediate chamber 116 and the valve 114.

Figure 3:
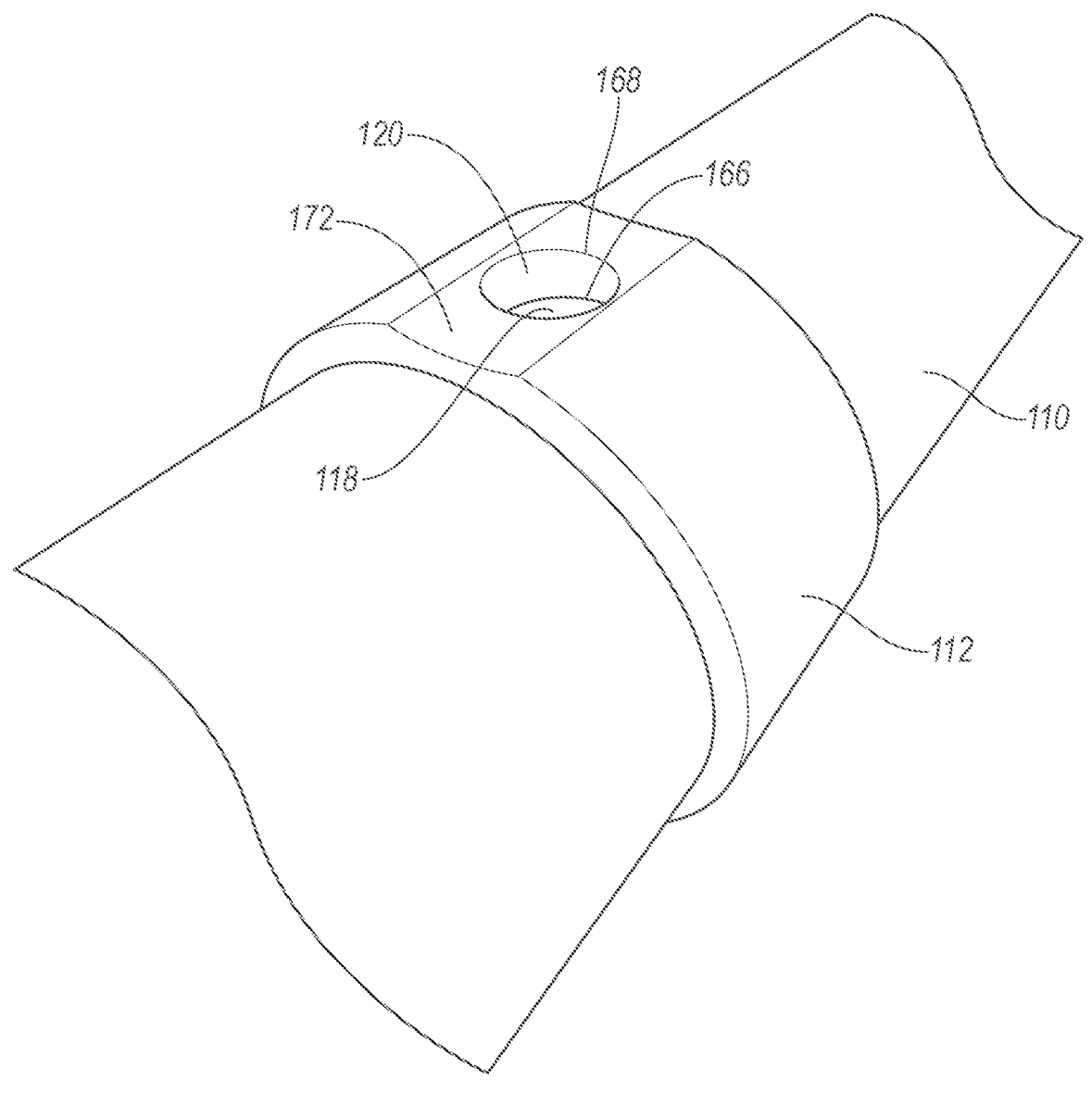
FIG. 3 is a perspective view of a portion of an intermediate tube of the damper with a ring attached.

The ring 112 is press-fitted around the outer diameter of the intermediate tube 110, as also shown in FIG. 3. A press fit is a fastening of two parts by inserting one part having a cross-section into another part having a hole with a slightly smaller cross-section, thereby holding the two parts together with friction. A press fit is sometimes referred to as an interference fit or a friction fit. A press fit is durable and secure and forms a seal between the parts. A relaxed outer diameter of the intermediate tube 110 is slightly larger than a relaxed inner diameter of the ring 112 to form the press fit. A radially inner surface of the ring 112 concentrically abuts a radially outer surface of the intermediate tube 110. The ring 112 is axially spaced from the cylinder openings 164.

The ring 112 includes the ring opening 120 extending radially through the ring 112. The ring opening 120 extends radially from a radially inner end 166 to a radially outer end 168. The radially inner end 166 abuts the intermediate tube 110. The radially outer end 168 abuts the valve 114. The ring opening 120 is aligned with the intermediate-tube opening 118. More specifically, the ring opening 120 has an overlapping axial and circumferential position with the intermediate-tube opening 118. The ring opening 120 and the intermediate-tube opening 118 together form a flow path from the intermediate chamber 116 to the valve 114. A diameter of the intermediate-tube opening 118 is at least as great as, e.g., equal to, a diameter of the ring opening 120. During design, the diameter of the ring opening 120 can be used to tune the damping force, while permitting the same intermediate tubes 110 to be used with differently tuned dampers 102.

The ring 112 has an axial width that is only as large as needed to accommodate the ring opening 120. The axial width is a distance that the ring 112 extends along the axis A. For example, the axial width can be less than the inner diameter of the ring 112. For ease of manufacturing, the axial ends of the ring 112 can be flat and perpendicular to the axis A, and the axial width can be constant circumferentially around the axis A.

The valve 114 may be positioned to control flow between the intermediate chamber 116 and the outer chamber 152. The valve 114 is attached to the outer tube 104, e.g., by being fixed in the valve receptacle 150. The valve 114 is in fluid communication with the intermediate chamber 116 through the ring opening 120 and the intermediate-tube opening 118. The valve 114 is in fluid communication with the outer chamber 152, e.g., through the valve receptacle 150. The outer chamber 152 is thereby in fluid communication with the intermediate chamber 116 via the valve 114.

The valve 114 is actuatable to adjust a flow rate between the outer chamber 152 and the intermediate chamber 116, e.g., by a signal from the ECU 130. For example, the valve 114 may be actuatable between a maximally open position and a minimally open position or closed position. The maximally open position can provide a largest flow rate between the outer chamber 152 and the intermediate chamber 116 of which the valve 114 is operationally capable. The minimally open position can provide a smallest flow rate between the outer chamber 152 and the intermediate chamber 116 of which the valve 114 is operationally capable. The valve 114 can be actuatable to the maximally open position, to the minimally open position or closed position, and to intermediate positions between the maximally open and minimally open or closed positions. Changing the flow rate changes the damping force of the damper 102.

The valve 114 may include a valve tube 170. The valve tube 170 abuts the ring 112 around the ring opening 120. The valve tube 170 may thereby form a seal with the ring 112. The valve 114 may be in fluid communication with the intermediate chamber 116 via the valve tube 170, the ring opening 120, and the intermediate-tube opening 118. The valve tube 170 may extend radially relative to the axis A from the ring 112 through the outer tube 104. The valve tube 170 may thereby provide a flow path extending radially outward from the ring opening 120 to the valve 114.

Movement of the piston 108 changes volumes of the first cylinder chamber 144 and the second cylinder chamber 146, thereby causing fluid flow along a flow path between the first cylinder chamber 144 and the second cylinder chamber 146. For example, during compression, movement of the piston 108 decreases the volume of the second cylinder chamber 146 and increases the volume of the first cylinder chamber 144. Fluid in the second cylinder chamber 146 flow through the endcap valve 154 into the outer chamber 152 and then into the valve 114. The fluid exits from the valve 114 through the valve tube 170, the ring opening 120, and the intermediate-tube opening 118 into the intermediate chamber 116. The fluid then flows from the intermediate chamber 116 through the cylinder openings 164 into the first cylinder chamber 144. During extension, movement of the piston 108 decreases the volume of the first cylinder chamber 144 and increases the volume of the second cylinder chamber 146. Fluid in the first cylinder chamber 144 flow through the cylinder openings 164 into the intermediate chamber 116. Fluid in the intermediate chamber 116 flows through the intermediate-tube opening 118, the ring opening 120, and the valve tube 170 into the valve 114. The fluid exits from the valve 114 into the outer chamber 152. The fluid in the outer chamber 152 then flows through the endcap valve 154 into the second cylinder chamber 146.

Various design choices affect the flow rate between the first cylinder chamber 144 and the second cylinder chamber 146, providing an ability to tune the damping force provided by the damper 102, e.g., the diameter of the ring opening 120, the axial offset of the cylinder openings 164 from the intermediate-tube opening 118, the number and relative positions of the cylinder openings 164, the length of the intermediate tube 110 and the locations of the first end 156 and second end 158 relative to the cylinder 106, the presence of the endcap valve 154 in the second endcap 140, etc.

Figure 4A:
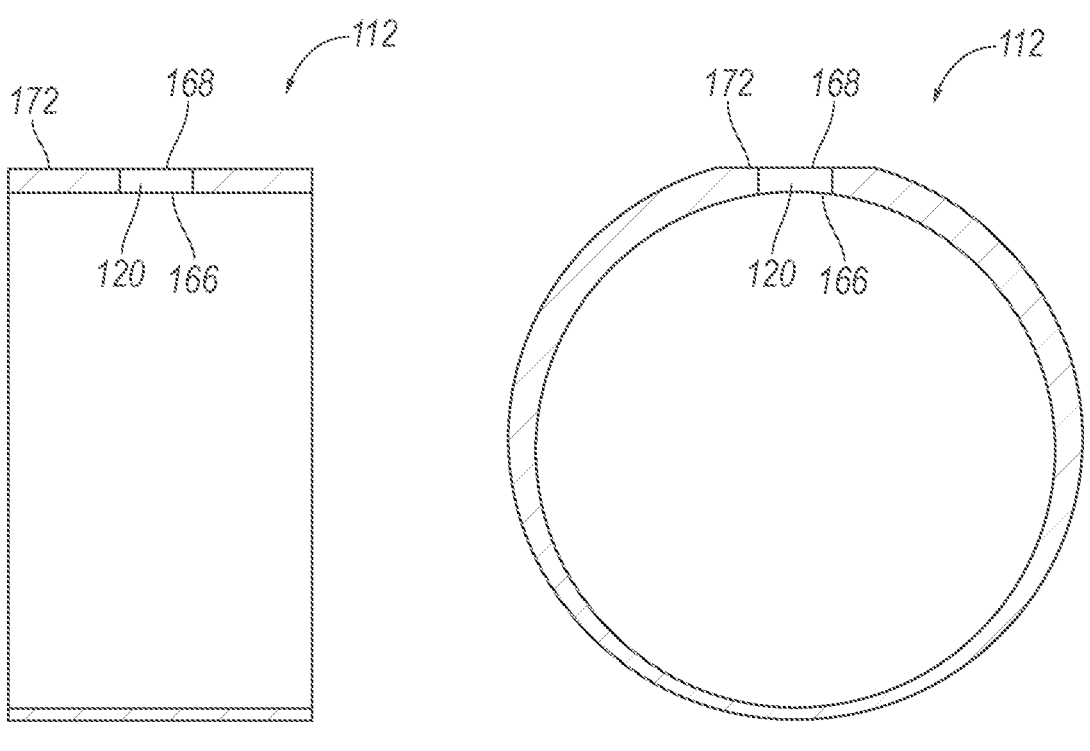
FIG. 4A shows side cross-sectional and plan views of an example ring.
Figure 4B:
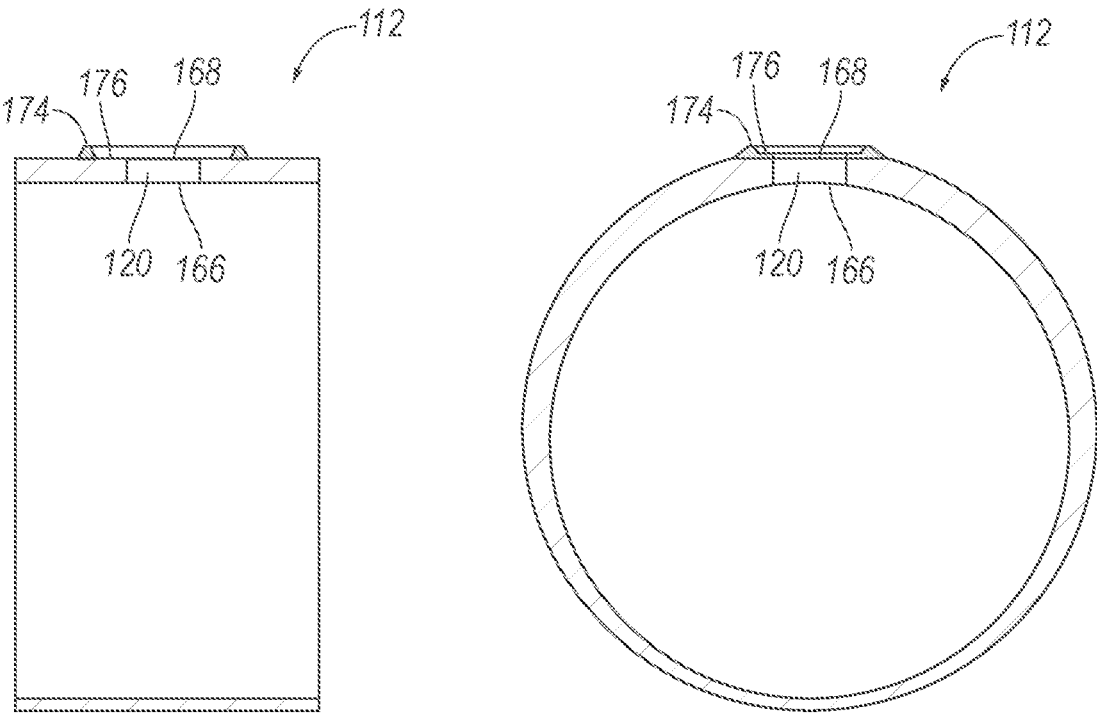
FIG. 4B shows side cross-sectional and plan views of another example ring.
Figure 4C:
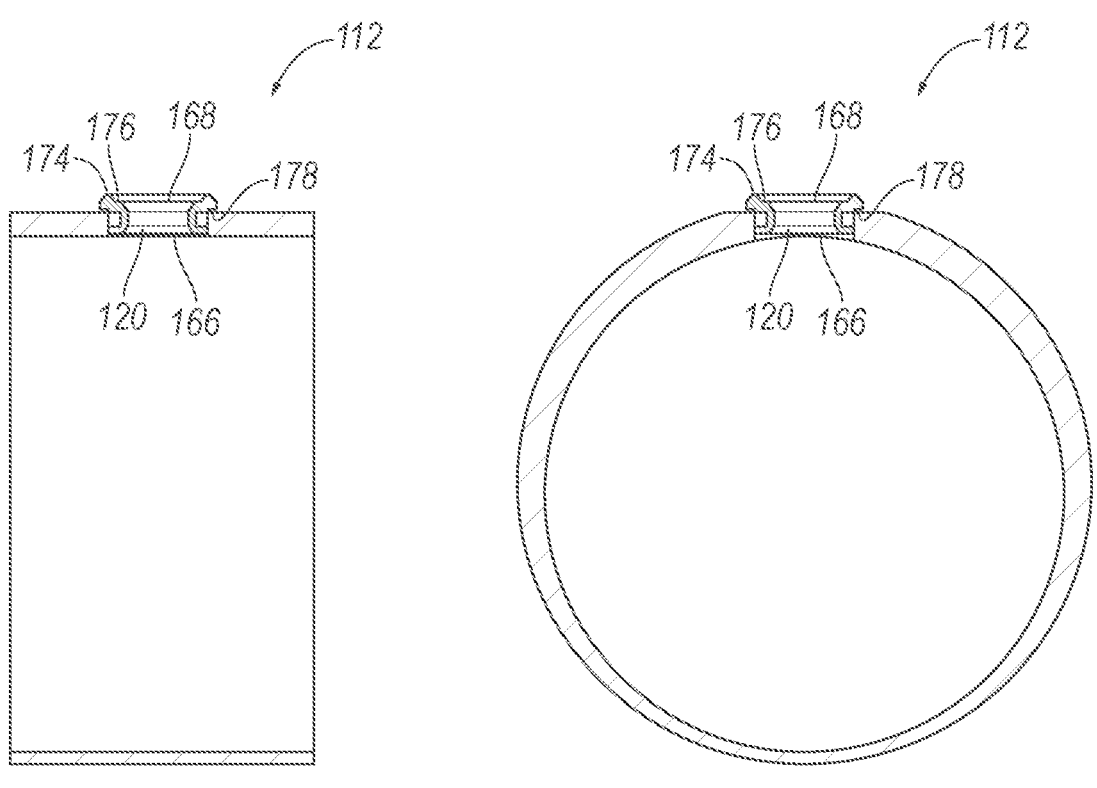
FIG. 4C shows side cross-sectional and plan views of another example ring.
Figure 4D:
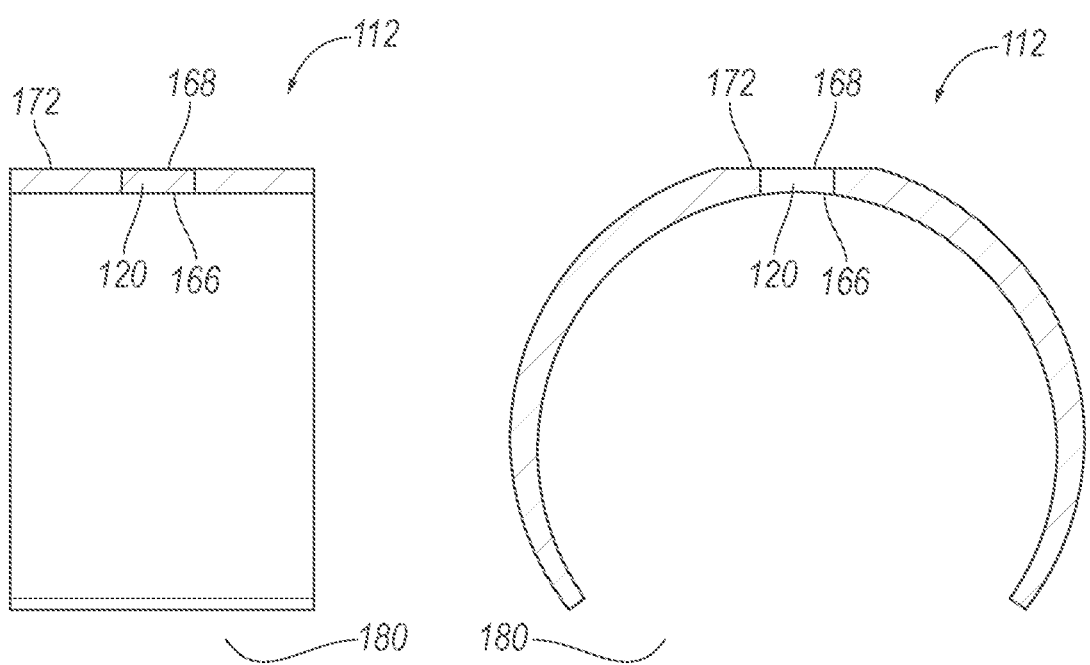
FIG. 4D shows side cross-sectional and plan views of another example ring.

With reference to FIGS. 4A-C, a radial thickness of the ring 112 may be greater at the ring opening 120 than at a point on the ring 112 that is 180° around the axis A from the ring opening 120. For example, the radial thickness can continuously decrease around the ring 112 in both directions from the ring opening 120 to a point farthest from the ring opening 120. Alternatively, as shown in FIG. 4D, the ring 112 may extend less than 360° around the axis A, leaving a circumferential gap 180 encompassing the point that is 180° around the axis A from the ring opening 120. The difference in thicknesses or the gap 180 can save material while still providing sufficient strength and durability at the ring opening 120.

With reference to FIG. 4A, the radially outer surface of the ring 112 may include a flat portion 172. The ring opening 120 may extend through the ring 112 at the flat portion 172, e.g., the flat portion 172 may encompass the radially outer end 168 of the ring opening 120. The flat portion 172 may extend along a small fraction of the circumference of the ring 112, e.g., less than one-eighth of the circumference. The flat portion 172 may be perpendicular to an axis defined by the ring opening 120. The valve tube 170 may abut the flat portion 172. The features of the flat portion 172 may provide for a good seal with the valve tube 170.

With reference to FIG. 4B, the ring 112 may include a ridge 174 extending around the radially outer end 168 of the ring opening 120. The ring 112 may include a ledge 176 extending around the radially outer end 168 of the ring opening 120 within the ridge 174. The ledge 176 may be flat. The valve tube 170 may abut the ring 112, e.g., the ledge 176, within the ridge 174. The ridge 174 may help locate the valve tube 170 around the ring opening 120. The ledge 176 may provide a location for the valve tube 170 to form a seal with the ring opening 120.

With reference to FIG. 4C, the damper 102 may include a sleeve 178 lining the ring opening 120. The sleeve 178 may extend from the radially inner end 166 of the ring opening 120 at a radially inner surface of the ring 112 to the radially outer end 168 at a radially outer surface of the ring 112. The sleeve 178 can permit the same ring 112 to be used for multiple diameters of the ring opening 120, e.g., by omitting the sleeve 178 for a larger diameter and including the sleeve 178 for a smaller diameter, or by including different sleeves 178 providing different diameters. The sleeve 178 may include the ridge 174 extending around the radially outer end 168 of the sleeve 178. The sleeve 178 may include the ledge 176 extending around the radially outer end 168 of the sleeve 178 within the ridge 174. The ledge 176 may be flat. The valve tube 170 may abut the sleeve 178, e.g., the ledge 176, within the ridge 174. The ridge 174 may help locate the valve tube 170 around the ring opening 120.

With reference to FIG. 4D, the ring 112 may include a flat portion 172 through which the ring opening 120 extends, as described above with respect to FIG. 4A. The ring 112 may extend more than 180° and less than 360° around the axis A. The ring 112 may leave the circumferential gap 180 encompassing the point that is 180° around the axis A from the ring opening 120. The gap 180 may extend less than 180° around the axis A. The gap 180 may reduce the size tolerances needed for press-fitting the ring 112 onto the intermediate tube 110, and the gap 180 may save material. Because the ring 112 extends more than 180° around the axis A, the ring 112 can still be press-fitted onto the intermediate tube 110 despite the presence of the gap 180. The ring 112 may have a constant radial thickness around the axis A from one circumferential end defining the gap 180 to the other circumferential end defining the gap 180 (other than the flat portion 172), permitting the ring 112 to be made from a sheet of constant thickness material.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

The invention claimed is:

1. A damper comprising:
an outer tube elongated along an axis;
a cylinder elongated along the axis within the outer tube;
a piston disposed in the cylinder and movable along the axis;
an intermediate tube attached concentrically around the cylinder, the intermediate tube and the cylinder defining an intermediate chamber radially between the cylinder and the intermediate tube;
a ring press-fitted around an outer diameter of the intermediate tube; and
a valve attached to the outer tube and in fluid communication with the intermediate chamber;
wherein the intermediate tube includes an intermediate-tube opening extending radially through the intermediate tube;
the ring includes an inner cylindrical surface having a first longitudinal axis and an outer cylindrical surface having a second longitudinal axis, the first and second longitudinal axes being offset from one another such that the ring includes a variable wall thickness;
the ring includes a ring opening extending radially through the ring;
the ring opening is aligned with the intermediate-tube opening; and
the valve is in fluid communication with the intermediate chamber through the ring opening and the intermediate-tube opening.

2. The damper of claim 1, wherein the valve includes a valve tube extending radially relative to the axis and abutting the ring, and the valve is in fluid communication with the intermediate chamber via the valve tube.

3. The damper of claim 2, wherein the valve tube extends radially through the outer tube.

4. The damper of claim 1, wherein a diameter of the intermediate-tube opening is at least as great as a diameter of the ring opening.

5. The damper of claim 4, wherein the diameter of the ring opening is equal to the diameter of the intermediate-tube opening.

6. The damper of claim 1, wherein the ring includes a radially outer surface, the radially outer surface includes a flat portion, and the ring opening extends through the ring at the flat portion.

7. The damper of claim 6, wherein the valve includes a valve tube extending radially relative to the axis and abutting the flat portion of the radially outer surface of the ring, and the valve is in fluid communication with the intermediate chamber via the valve tube.

8. The damper of claim 1, wherein the ring opening extends from a radially inner end to a radially outer end, and the ring includes a ridge extending around the radially outer end of the ring opening.

9. The damper of claim 8, wherein the valve includes a valve tube extending radially relative to the axis and abutting the ring within the ridge, and the valve is in fluid communication with the intermediate chamber via the valve tube.

10. The damper of claim 1, further comprising a sleeve lining the ring opening.

11. The damper of claim 10, wherein the sleeve extends from a radially inner end at a radially inner surface of the ring to a radially outer end at a radially outer surface of the ring, and the sleeve includes a ridge extending around the radially outer end of the sleeve.

12. The damper of claim 11, wherein the valve includes a valve tube extending radially relative to the axis and abutting the sleeve within the ridge, and the valve is in fluid communication with the intermediate chamber via the valve tube.

13. The damper of claim 1, wherein the ring extends more than 180° and less than 360° around the axis.

14. The damper of claim 1, wherein a radial thickness of the ring is greater at the ring opening than at a point on the ring 180° around the axis from the ring opening.

15. The damper of claim 1, wherein the outer tube defines an outer chamber, and the outer chamber is in fluid communication with the intermediate chamber via the valve.

16. The damper of claim 15, wherein the valve is actuatable to adjust a flow rate between the outer chamber and the intermediate chamber.

17. The damper of claim 1, wherein the cylinder defines a cylinder chamber, and the cylinder includes a cylinder opening permitting flow between the cylinder chamber and the intermediate chamber.

18. The damper of claim 17, wherein the cylinder opening is offset along the axis from the ring.

19. The damper of claim 1, wherein the intermediate tube extends axially from a first end to a second end, the first end of the intermediate tube is sealed to the cylinder around the outer diameter of the cylinder, and the second end of the intermediate tube is sealed to the cylinder around the outer diameter of the cylinder.

20. The damper of claim 1, wherein the piston divides the cylinder into a first cylinder chamber and a second cylinder chamber, and movement of the piston changes volumes of the first cylinder chamber and the second cylinder chamber.

* * * * *